Nov. 1, 1949  J. STUER  2,486,997
HORIZONTALLY MOVABLE TRANSFER HAMMER
DOG FOR AUTOMATIC LOOMS
Filed Jan. 2, 1947
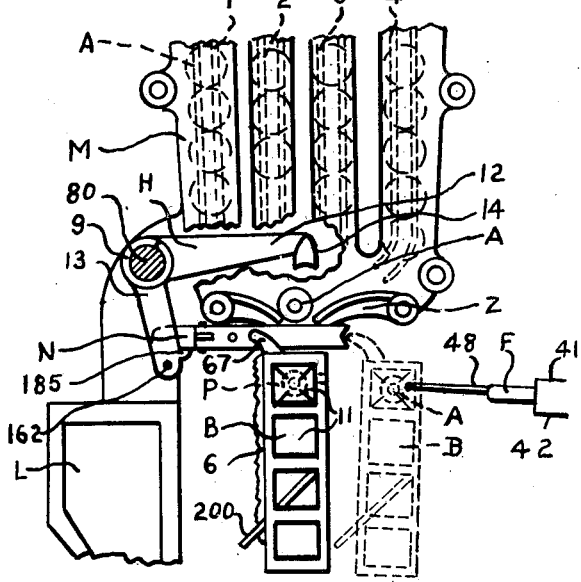
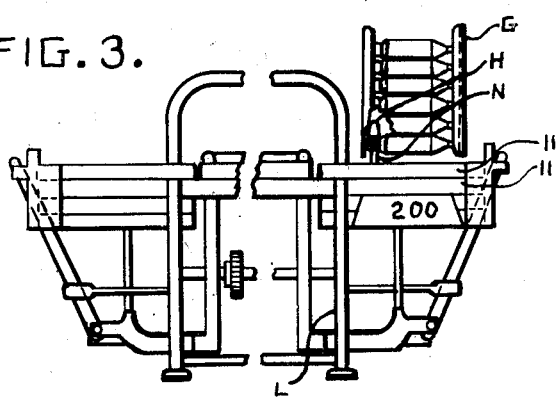
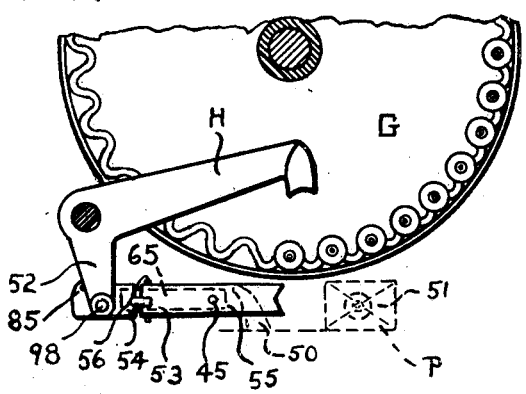
INVENTOR
Joseph Stuer
BY Pearson & Pearson
ATTORNEYS Patented Nov. 1, 1949

2,486,997

UNITED STATES PATENT OFFICE 2,486,997

HORIZONTALLY MOVABLE TRANSFER HAMMER DOG FOR AUTOMATIC LOOMS

Joseph Stuer, Lawrence, Mass., assignor to Pearson & Pearson, Lowell, Mass., a partnership Application January 2, 1947, Serial No. 719,877

4 Claims. (Cl. 139—243)

This application is a continuation in part of applications for United States Letters Patent by Joseph Stuer on Stationary magazine loom, filed September 2, 1943, Patent No. 2,418,101, and Loom transfer mechanism, filed July 30, 1945, Patent No. 2,418,324, copending herewith.

Those applications and this show a device or devices applied to a bobbin changing loom using one or more shuttles and having a reserve bobbin magazine and either one shuttle box or vertically shifting shuttle boxes under the magazine, transfer mechanism and a weft feeler. The devices covered in this application are part of a transfer mechanism which includes a hammer arm and a head for forcing a full bobbin to take the place of an empty bobbin in a cell or a shuttle box, and a dog arm to which a dog is pivoted in such a position that when it is moved in front of a bunter carried by the lay, this transfer dog and arm are pushed forward near front center whereby the hammer arm with its head is carried down onto a reserve bobbin thus effecting transfer of this bobbin into a shuttle.

The particular feature of this application is the mechanism for positioning the transfer dog to engage the bunter when the feeler, preferably of the electrical type, indicates near exhaustion and closes the circuit to a solenoid or magnet which pulls a spring locking pin, or equivalent member or part, which ordinarily holds the dog in inoperative position, but which when pulled against its spring by the solenoid allows or causes the dog to assume its operative position with its free end in the path of the bunter.

Preferably I accomplish this by interposing a solenoid carried by the stationary frame of the loom and connected by a flexible member, such as a chain, with such a movable part of the dog.

Advantages of this device in its various embodiments are that the devices for positioning the dog in the path of the bunter are all carried by the dog holding transfer arm, except for a connection, which is preferably flexible, to a solenoid or similar electrical device which is energized by closing an electric circuit through a feeler.

The whole control is thus very much simplified and is not dependent upon the action of any cutter or other mechanism thus allowing such cutter or other mechanisms to be operated without reference to the dog and bunter.

The main idea of my device is to simplify the control of the dog and I do this by using a controlling member which may be of various kinds for various looms of different sizes and to accommodate different spaces. In all cases, the dog or device which is engaged by a bunter on a loom is freely pivoted on the dog holding arm of a transfer device of a well known type and it is held out of reach of the bunter by a dog controlling device which in whole or in part is operable by an electric feeler and solenoid whereby on transfer the free end of the dog is moved sideways into the path of the bunter.

This invention includes a solenoid to overcome the force of a spring, which normally holds the end of the dog out of or in the path of the bunter, between the parts of a two part dog, one part pivoted on a horizontal pivot to the transfer arm and the other part pivoted to it on a vertical pivot, the solenoid being connected directly with that part of the dog which is to engage the bunter to pull it into position against such a spring which may be called the controlling member.

Throughout the specification and claims I use the term "arm" as applied to the member on which the dog is freely pivoted, although as shown in the drawings, it ends in two members between which the dog is carried, because in some looms, this dog carrying arm starts as a single member and ends in a fork with two prongs and it is really one bifurcated arm.

For clearness I mean by "transfer" or "transfer hammer" the device pivoted to the loom frame which is substantially a bell crank lever with two arms, one to carry a head to engage a full bobbin and the other to support a dog.

In a loom of the pick and pick type such as shown in patents to Joseph Stuer, Nos. 2,207,078; 2,353,323; 2,365,362; 2,418,101 and 2,418,324, there is a shifting or drop box on the magazine side with two cells and on the other side there is a drop box with two or more cells and the sequence of movements of the drop boxes and their cells is such that there is a shuttle in a drop box cell which cell is above the shuttle race when a shuttle in a lower box is being picked. Such an arrangement is also shown in Wakefield Patent No. 2,065,776 in which there may be a feeler at the back, which feeler will engage the bobbin in the shuttle in the top cell at back center.

The time interval during which the contacts of the feeler engage to close the solenoid circuit can be so arranged that the time of solenoid activation and of pullig and holding the dog can be long or short.

In a loom, where there is a feeler with a pivoted finger, the feeler finger can be of such length and the other parts so arranged that it will close the feeler circuit to the dog moving solenoid during a predetermined interval while the lay is moving between top, back and bottom centre.

The transfer arm to which the two part dog is pivoted and both parts of the dog can be pivoted at such points and can be of such length and of such shape that the bunter will engage the free end of the two part dog during any desired interval between back, bottom and front center and so that after the bunter engages the dog, the parts will remain together until transfer at or near front centre. The contact of the bunter and dog can therefore be adjusted to continue after the current through the solenoid, closed by the feeler, has been opened.

As the lay returns between front and top centre, the bunter is released from the dog and the dog spring moves the pivoted part of the dog to its normal position, out of the path of the bunter.

There may be other arrangements of feeler and of my horizontally movable pivoted dog part which, by proper adjustment, will accomplish the same thing. Instead of the solenoid pulling the horizontally movable pivoted part of the dog into engageable position for the bunter for transfer, the process can be reversed and the dog controlling member, namely a spring can be so made that it normally holds the dog in engageable position, but the solenoid will pull it out of position on every pick except at the critical time when the feeling on an empty bobbin opens instead of closes the circuit through the solenoid.

Substantially all of the views of the drawings are diagrammatic and are copied with such modifications as seem to make the construction clearer from co-pending applications of this inventor, Patent No. 2,418,101, and Patent No. 2,418,324.

Fig. 1 is an elevation from the outer side, showing part of a stationary magazine together with the transfer and lay with a multiple cell shuttle box.

Fig. 2 is a diagram of the feeler and electrical connection to a solenoid such as used in this device.

Fig. 3 is a diagrammatic front elevation of a loom with a stationary magazine showing location of the transfer hammer and some other parts.

Fig. 4 is a side elevation of a transfer hammer equipped with my device in the position of the parts when a full bobbin has replaced an empty bobbin or almost empty bobbin in a shuttle in a top cell of a shuttle box.

Fig. 5 is an enlarged side elevation showing the bottom of a transfer hammer dog arm with a dog of my construction and Fig. 6, a plan view of the same assembly as that shown in Fig. 5, with some parts shown in section.

Fig. 7 is a diagrammatic side elevation similar to Fig. 1, showing the application of my device to a magazine of the rotary battery type.

Fig. 8 is a view similar to Fig. 6 of a modification.

Figs. 7, 8, and 4, 5, 6 show diagrammatically three modifications of the dog shown in Fig. 1 at N.

In all the drawings, L indicates the frame of a bobbin changing loom.

There may be a plurality of shuttles P, P, and vertically shifting shuttle boxes such as B. Each box might have a plurality of cells 11 or a single cell.

M indicates a magazine which, as shown, is of the multiple stack type each stack 1, 2, 3, 4, including a plurality of bobbins such as A, A. On the top box B of lay 6, is a bunter 67 of the usual form and pivoted on the frame L at 80 is a transfer hammer H which has two arms 12 and 13 shown diagrammatically in Figs. 1, 4, 5, 6 and 8 and at 52 in Fig. 7, one 12 carrying the usual head 14 for contact with a bobbin A on transfer and the other 13, carrying the horizontal pivot pin 162 for dog N. 9 is the usual transfer spring. Z represents giveways. 185 is a stop on arm 13 to prevent dog N from dropping below bunter 67.

F indicates a feeler of the electrical type shown as positioned at the back of the loom frame, although it might be located in any other position, the feeler being provided with a contact switch 40 which, when its feeler finger 48 slips on an almost exhausted bobbin, closes a circuit through the wires 41 and 42 from a source of electricity such as a battery 43 through a solenoid S. This solenoid S has a core 44 connected by a wire 45 to a two part dog N.

Feeler F is of a common type, its movable arm 36 with feeler finger 48 and member 38 of switch 40 and pivot 37 being normally slidable back and forth but when finger 48 slips as shown by the dotted lines, arm 36 pivots and switch member 38 engages spring switch member 39 forcing it back and closing the circuit. This circuit remains closed while the lay moves back and then forward until the feeler arm 36 resumes its full line position shown in Fig. 2, on account of the pressure of switch member 39 on contact member 38.

In Figs. 4 and 5, I show the details of the dog in two parts 61 and 63, the part 61 being pivoted to the dog arm 13 on the horizontal dog pivot 62 and part 63 being pivoted to the part 61 on a vertical pivot 64, there being a spring 65 between the parts 61 and 63 which tends to keep the parts 63 away from the bunter 67 as shown in Fig. 6, until and unless it is pulled by a connecting member 45, which should be flexible, from the armature 44 of a solenoid S, whereupon it is engaged by the bunter 67 and is not released until the bunter lets go of it, when it springs sideways to its usual position shown by full lines in Fig. 6.

M as shown is a stationary magazine with a shuttle drop box having two active cells 11, 11 under which is a chute 200 as in many of this type of looms.

85 is a stop to prevent the dog N from dropping below bunter 67. Bunter 67 may be above pivot 62 as is bunter 67 in Fig. 1 where bunter 67 is shown as being above pivot 162 and bunter 67 is preferably attached to the top of drop box B or cell 11 as in patent to Stuer No. 2,365,362.

The contacting faces 68 and 69 of the dog and of bunter 67 can be, as shown in Fig. 5, of such shape that they will not allow so much slipping vertically as to lose contact, but friction may be depended on to keep the parts together. The spring 65 can be heavy or light and can be so made and of such strength with reference to the pull of the solenoid S, that they will neutralize each other and part 63 of a dog such as N will stop at the position shown by the dotted lines in Fig. 6. Member 45 may be used as a stop.

The spring 65, the solenoid S, member 45 or any of them can therefore be called a stop for the dog, as much as is 85 to keep the dog in operative or inoperative position or in or out of the path of the bunter.

The dog arms 13 shown diagrammatically in Figs. 1, 4, 5, 6, and 8 respectively, and 52 in Fig. 7, may be long or short at any suitable angle and the pivotal connections to a dog such as N, 61—63, or 54—55 may be varied to suit the loom.

In Fig. 7, I show the application of my device to a rotary battery loom with a single shuttle box or cell 51 and with no drop box. The battery G and transfer hammer H are of well known types. The bunter 50 may be attached to any part of the lay carrying the single box 51 on the battery side.

The dog arm of the transfer hammer H is represented by 52 and carries the dog 53 on a horizontal pivot pin 98. Dog 53 is formed of two parts consisting of a part 54 pivoted on a horizontal pivot pin 98 held by arm 52 and a second part pivoted on a vertical pin 56 held by member 54, the movable part 55 being connected by a flexible member 45 with a solenoid S.

In Fig. 8, I show a view similar to Fig. 6 with the same type of two part dog, with pivots and connections, and a bunter 67, the difference being that the spring 70, as shown by the full lines would normally keep the dog in the path of the bunter 67 except that the solenoid S overcomes the spring with its connecting member 45 both being on the same side.

The feeler with its switch, contacts, and connections in this case is so adjusted that normally the solenoid S is energized thus holding the movable part of the dog out of the path of the bunter as shown in the dotted lines. On indication, the circuit is instantly broken and the dog controlling spring 70 causes this movable part to spring back to its position in the path of the bunter as shown in the full lines.

The fundamental idea of this device is a two part dog carried by a dog arm with a part pivoted on a vertical pivot so that normally it can move horizontally in what is substantially the horizontal plane of the path of the bunter. The position of the bunter with reference to the free end of the pivoted part of the dog when the solenoid is not energized and when the solenoid pulls this pivoted part can readily be regulated by positioning a suitable stop or stops, changing the strength of the spring or solenoid and by the arrangement of the connecting member such as 45 between this pivoted member and the solenoid.

The contacting edges of the end of the dog and of the bunter can be varied in many ways to make allowances for variations in the size and the position of the various parts of the transfer hammer. While I prefer to have the feeler positioned at the back of the loom under the magazine, it might be positioned in some other part of the loom such as on the off magazine side at the front and it can be so adjusted that until indication it would normally cause a solenoid to move the horizontally movable part of the dog out of the path of the bunter, but upon indication, the dog would remain in that path ready for transfer on the next forward movement of the lay.

I claim:

1. In a bobbin-changing loom having a stationary frame and a movable lay, a bunter carried by the lay on the magazine side to engage the free end of a dog, a magazine holding two or more bobbins and including devices to hold a full bobbin for transfer, a shuttle box carried by the lay to be in position under the full bobbin holding means, bobbin transfer mechanism including a transfer hammer having an arm to engage said full bobbin and a dog holding arm, a weft feeler, said weft feeler being of the electrically operable type, a dog pivot carried by the dog holding arm; a two part dog one part pivoted on said dog pivot and the other part being pivoted to the first part on a vertical pivot; a stop to hold the free end of the dog normally in the horizontal plane of the path of the bunter; a dog controlling member carried by and movable with the dog holding arm, said member including a spring between the two parts of the dog to hold the free vertically pivoted end of the dog out of the path of the bunter, and a solenoid in circuit with and energized by the weft feeler and including an armature and a connection from the armature to the vertically pivoted part of the dog to cooperate with the spring to allow the free end of the dog to move into the path of the bunter.

2. In a bobbin-changing loom having a stationary frame and a movable lay, a bunter carried by the lay on the magazine side to engage the free end of a dog, a magazine holding two or more bobbins and including devices to hold a full bobbin for transfer, a shuttle box carried by the lay to be in position under the full bobbin holding means, bobbin transfer mechanism including a transfer hammer having an arm to engage said full bobbin and a dog holding arm, a weft feeler, said weft feeler being of the electrically operable type, a dog pivot carried by the dog holding arm; a two part dog one part pivoted on said dog pivot and the other part being pivoted to the first part on a vertical pivot; a stop to hold the free end of the dog normally in the horizontal plane of the path of the bunter; a dog controlling member carried by and movable with the dog holding arm, said member including a spring between the two parts of the dog to hold the free, vertically pivoted end of the dog normally in a predetermined position, and a solenoid in circuit with and energized by the weft feeler and including an armature and a connection from the armature to the vertically pivoted part of the dog to cooperate with the spring to overcome the force of the spring when the feeler indicates exhaustion.

3. In a bobbin-changing loom having a stationary frame and a movable lay, a bunter carried by the lay on the magazine side to engage the free end of a dog, a magazine holding two or more bobbins and including devices to hold a full bobbin for transfer, a shuttle box carried by the lay to be in position under the full bobbin holding means, bobbin transfer mechanism including a transfer hammer having an arm to engage said full bobbin and a dog holding arm, a weft feeler, said weft feeler being of the electrically operable type; a two part dog freely pivoted to the dog holding arm and having a free end so pivoted as to be movable horizontally into and out of the path of the bunter; a stop to hold the free end of the dog in the horizontal plane of the path of the bunter; a dog controlling member carried by and movable with the transfer hammer, said member including a spring between the two parts of the dog to hold the free, vertically pivoted end of the dog normally in a predetermined position; and a solenoid in circuit with and energized by the weft feeler and including an armature and a connection from the armature to the dog to overcome the force of the spring when the feeler indicates exhaustion.

4. In a bobbin-changing loom having a stationary frame and a movable lay, a bunter carried by the lay on the magazine side to engage the free end of a dog, a magazine holding two or more bobbins and including devices to hold a full bobbin for transfer, a shuttle box carried by the lay to be in position under the full bobbin holding means, bobbin transfer mechanism including a transfer hammer having an arm to engage said full bobbin and a dog holding arm, a weft feeler positioned on the loom frame at the back on the magazine side, said weft feeler being of the electrically operable type; a two part dog pivoted to the dog holding arm on a horizontal pivot and having a free end so pivoted on a vertical pivot as to be movable horizontally into and out of the path of the bunter; a stop to hold the free end of the dog in the horizontal plane of the path of the bunter; a dog controlling member carried by and movable with the transfer hammer, said member including a spring between the two parts of the dog to hold the free end of the dog out of the path of the bunter; and a solenoid in circuit with and energized by the weft feeler and including an armature and a connection from the armature to the dog to pull the free end of the dog in to the path of the bunter when the feeler indicates exhaustion or near exhaustion of yarn on a bobbin in a shuttle.

JOSEPH STUER.

No references cited.